H. ENGEL.
APPARATUS FOR THE EXTRACTION OF OILS AND THE LIKE.
APPLICATION FILED DEC. 16, 1919.

1,415,433. Patented May 9, 1922.

Inventor.
Henri Engel,
By. A. Singer
Atty.

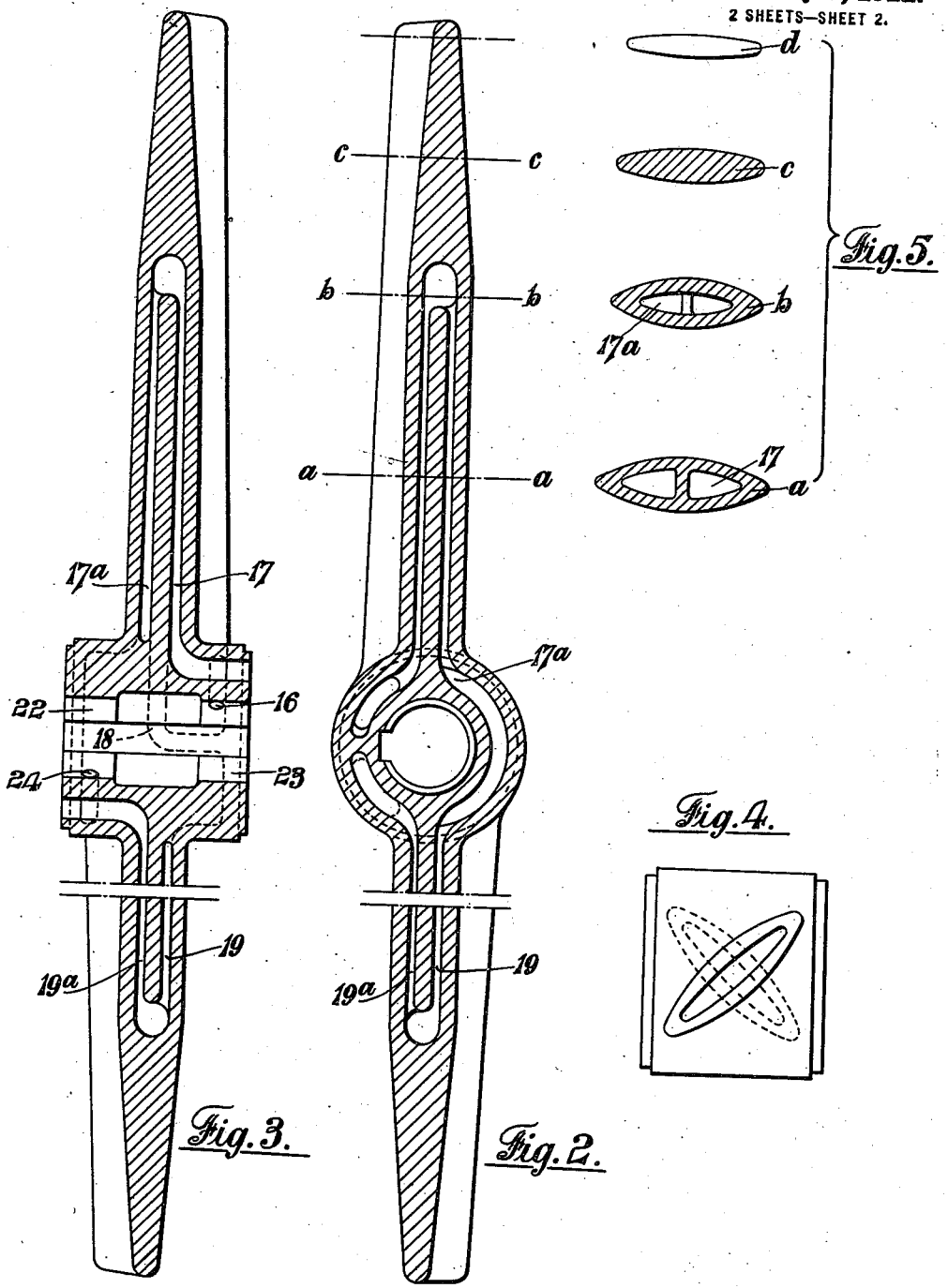

UNITED STATES PATENT OFFICE.

HENRI ENGEL, OF HATCH END, ENGLAND.

APPARATUS FOR THE EXTRACTION OF OILS AND THE LIKE.

1,415,433. Specification of Letters Patent. Patented May 9, 1922.

Application filed December 16, 1919. Serial No. 345,253.

*To all whom it may concern:*

Be it known that I, HENRI ENGEL, a subject of the Queen of Holland, residing at Hatch End, Middlesex, England, have invented new and useful Improvements in Connection With Apparatus for the Extraction of Oils and the like, of which the following is a specification.

This invention relates to improvements in connection with oil extraction apparatus such as is employed for the purpose of extracting oil by means of solvent from palm kernel, peanut, bean or the like meal, or other finely divided oil containing substances, and the object of the invention is the provision of an improved and simplified stirring apparatus of the kind in which the means employed to keep the material undergoing treatment in an agitated condition also serves to impart the necessary heat to these materials.

According to the present invention means are provided whereby the steam or other heating agent is compelled to circulate completely through each stirring arm of the agitating means before it can pass to the next.

By reason of this arrangement the whole of the stirring apparatus is heated uniformly and consequently the contents of the container are properly heated throughout. Moreover by regulating the rate at which steam is supplied condensation inside the stirring arms can be prevented, and if the steam is introduced at the top of the propeller shaft and exhausted at the bottom any water of condensation which may appear in the stirring apparatus is drained out through the exhaust and prevented from obstructing the flow of steam.

The invention will now be described with reference to the accompanying drawings in which:—

Figure 2 is a sectional view of one of the agitating devices showing the steam passages.

Figure 3 is another sectional view of the agitating device taken at right angles to Figure 2.

Figure 4 is a plan of an agitating device and

Figure 5 shows four plan views of one of the blades of the agitating device, three being sections taken respectively on the lines $a$—$a$, $b$—$b$, and $c$—$c$ of Figure 2.

Figure 1:
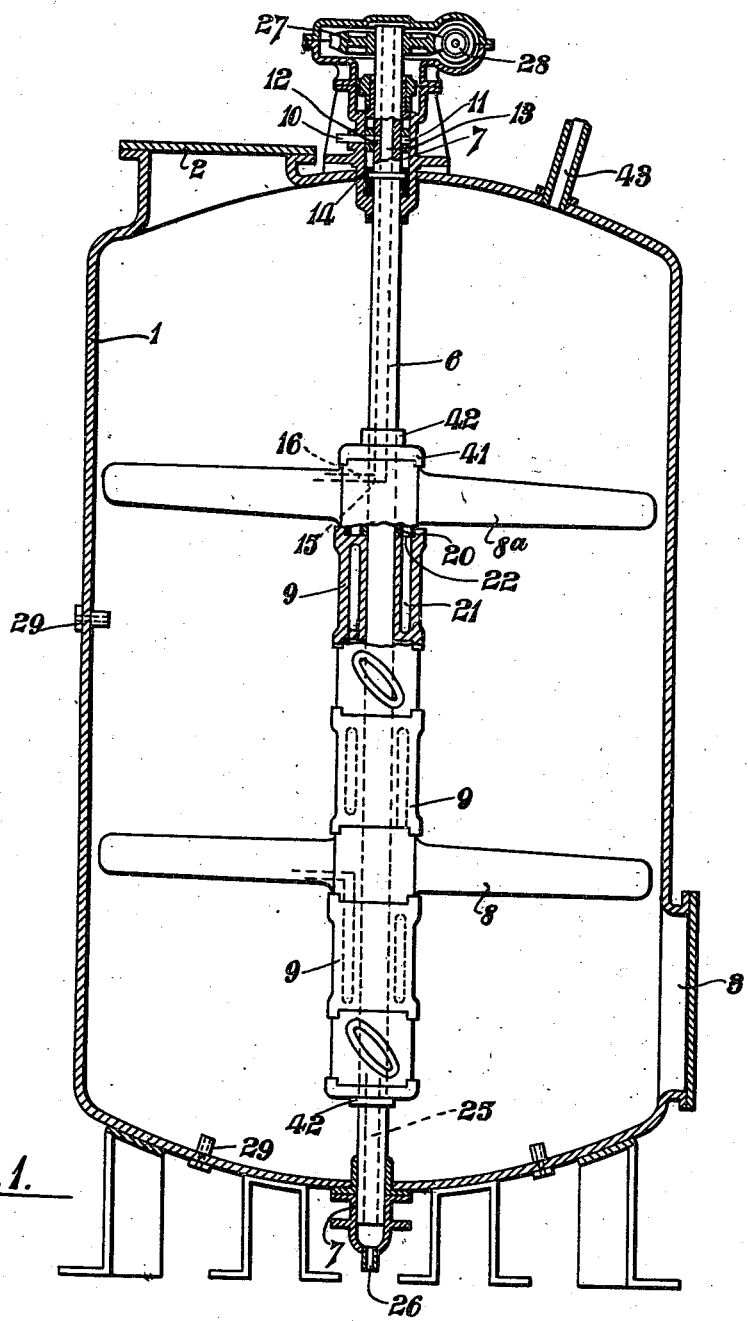
Figure 1 is a general view of an apparatus for the extraction of oil constructed according to the invention.

The extractor comprises a pot or cylindrical charge vessel 1 provided at its upper and lower ends, with manholes or other openings 2 and 3 adapted to be closed by removable covers. The manholes 2, 3 permit access to be obtained to the interior of the vessel and enable material to be introduced for treatment and withdrawn at the conclusion of the extraction process.

Mounted co-axially with the vessel 1 is a shaft 6 carried in suitable bearings 7 at the upper and lower ends of the vessel 1 and adapted to carry any suitable number of hollow bladed stirring arms or propellers 8, maintained at the required distance apart by means of distance pieces 9. To enable steam to circulate through the hollow stirring arms a steam inlet 10 is provided in the stuffing box of the upper bearing 7 communicating with an annular space 11 around a portion of the shaft 6 in which a port 12 is formed, said port communicating with a tubular passage 13 formed longitudinally within the shaft and extending downwardly as far as the boss of the first pair of stirring arms. The packing 14 of the stuffing box prevents leakage of steam along the external periphery of the shaft from the annular space 11.

The passage 13 communicates by means of a port 15 in the shaft with a port 16 in the boss of the first stirring element 8[a] which port communicates with a passage 17 passing outwards through one blade of the stirring element 8[a] and returning as shown at 17[a] towards the boss whence it continues around substantially half the circumference of the boss at 18 and communicates with passages 19 and 19[a] similar in shape to the passages 17 and 17[a] formed in the opposite blade of the stirring element.

In Figure 5, $a$ is a cross section of one of the blades of a stirring member, $b$ is a section taken at a narrower part of the blade, these views showing the shapes of the passages 17 and 17[a], $c$ is a section through the solid portion of the blade near the extremity and $d$ is a plan of the outer extremity of the blade.

The bosses of each of the stirring elements engage the distance pieces 9 by spigot and socket joints as shown at 20, suitable jointing material being inserted in practice to make a steam tight joint. Each distance piece 9 is keyed to the shaft 6 and is formed with an internal annular space 21 communicating by means of ports 22 with inlet and outlet ports 23 in the boss of each stirring element. It should be noted that the port 16 is only formed in the boss of the upper stirring element, whilst at 24 in the boss of the lowermost stirring element is another port by which steam can enter a second passage 25 in the shaft 6 through which steam is exhausted through an outlet 26 in the lower stuffing box 7 to a suitable condenser. An outlet 43 for vapour and used solvent is also provided.

The shaft 6 may be driven in any convenient manner, as for example by the worm wheel 27 and worm 28 driven from any suitable source of power, whilst to maintain the stirring members and distance pieces in close engagement and in correct position on the shaft they are adapted to be clamped between a collar 41 and lock nuts 42.

The vessel 1 is provided with a number of nozzles 29 disposed as shown in the sides and bottom thereof and through which steam is introduced during the operation.

The operation of the invention is as follows:—

Material to be treated and extracting agent are introduced into the vessel 1 through the opening 2 by any suitable means the opening being then closed and the mixture subjected to heat and stirring action. To effect this the shaft 6 is rotated and live steam introduced through the port 12. The steam passes down the passage 13, through port 15 and enters the boss of the first stirring element 8ª by port 16 from whence it passes through passages 17, 17ª, 18, 19 and 19ª and enters the distance piece through ports 22 and 23. The steam passes in this manner through all the stirring elements and distance pieces, finally returning to the shaft 6 by port 24 and passage 25 and passing to exhaust through the opening 26.

The propellers or stirring elements 8 are mounted upon the shaft 6 in such a manner that the pitch of each one moves the meal upward at each revolution and in so doing the material is prevented from adhering to the blades by its sliding up the incline of the blade, this method of stirring being kept up continuously from the time the vessel 1 is filled until it is ready to be emptied. The process of stirring is usually continued for some hours during which the whole of the material is repeatedly brought into intimate contact with the heated surfaces of the blades, whilst constant agitation is produced by rotation of the latter and prevents material from remaining in a compact condition.

By this process the material is uniformly heated instead of having local areas of heated material. The material as a whole is raised to the desired temperature, and hence extraction takes place much more uniformly and with greater speed than has hitherto been possible with existing plants.

At the conclusion of the period of treatment of a quantity of material the opening 3 at the base of the vessel 1 is opened and the direction of motion of the shaft 6 is reversed thereby causing the stirring elements to force the material downwardly and assist in discharging the contents of the vessel the extracted oils, fats or the like being led away to storage or for further treatment by any convenient means.

Before discharge of the treated material after extraction has been completed, steam is introduced into the vessel 1 through the nozzles 29 causing volatilization of any remaining extracting agent which is led away through the outlet 43 for condensation and re-use.

Although the invention has been described with reference to its application to oil extraction apparatus, it will be obvious that its scope is not limited to such application as it can be applied to any process wherein materials require to be uniformly heated and agitated simultaneously.

I claim:—

1. Apparatus for the extraction of oils, fats or greases from substances containing or yielding the same, comprising an extraction vessel, means to introduce solvent therein, propelling devices to urge the substances axially of the vessel and thereby maintain a constant circulation within said vessel, means for bringing every portion of the material under treatment into repeated contact with fresh solvent, and means for passing heating fluid through all of said propelling devices in succession.

2. Apparatus for the extraction of oils, fats or greases from substances containing or yielding the same, comprising an extracting vessel, propelling blades on said shaft to urge the substances axially of the vessel, a central shaft mounted in said vessel, an inlet for heating fluid at one end of said shaft, means causing said heating fluid to traverse successively through the propelling blades and means independent of said shaft for maintaining constant fluid communication between said propelling blades.

3. Apparatus for the extraction of oils, fats or greases from substances containing or yielding the same, comprising an extracting vessel, a central shaft mounted therein, propelling devices mounted upon said shaft, central bosses formed in said propelling devices, sleeves mounted upon said shaft between adjacent propeller bosses, an inlet for heating fluid at one end of said shaft, an outlet for said fluid at the opposite end of said shaft, means causing said heating fluid to traverse successively through the blades of each propelling device, and ports in said sleeves for maintaining constant communication between said propelling devices.

4. Apparatus for the extraction of oils, fats or greases from substances containing or yielding the same comprising an extracting vessel, a plurality of propelling devices disposed within said vessel, means whereby a heating fluid passes successively through all of said propelling devices, and means for introducing solvent in a direction opposite to that in which said substances are moved by said propelling devices.

5. Apparatus for the extraction of oils, fats or greases from substances containing or yielding same, comprising an extracting vessel, a central shaft mounted therein, propelling devices mounted upon said shaft, an inlet for heating fluid at one end of said shaft, an outlet for said fluid at the opposite end of said shaft, means causing said heating fluid to traverse successively through the blades of each propelling device, means independent of said shaft for maintaining constant fluid communication between said propelling devices, and means for introducing solvent in a direction opposite to that in which said substances are moved by said propelling devices.

6. Apparatus for the extraction of oils, fats or greases from substances containing or yielding same, comprising an extracting vessel, a central shaft mounted therein, propelling devices mounted upon said shaft, central bosses formed in said propelling devices, sleeves mounted upon said shaft between adjacent propeller bosses, an inlet for heating fluid at one end of said shaft, an outlet for said fluid at the opposite end of said shaft, means causing said heating fluid to traverse successively through the blades of each propelling device, ports in said sleeves for maintaining constant communication between said propelling devices, and means for introducing solvent in a direction opposite to that in which said substances are moved by said propelling devices.

7. Apparatus for the extraction of oils, fats or greases from substances containing or yielding the same, comprising an extracting vessel, a central shaft mounted therein, propelling devices mounted upon said shaft, an inlet for heating fluid at one end of said shaft, an outlet for said fluid at the opposite end of said shaft, means causing said heating fluid to traverse successively through the blades of each propelling device, means independent of said shaft for maintaining constant fluid communication between said propelling devices, an inlet for said substance at one end of said vessel, an outlet for said substance at the opposite end of said vessel, and means whereby the reversal of propelling devices causes said substance to pass through the outlet therefor.

8. Apparatus for the extraction of oils, fats or greases from substances containing or yielding the same, comprising an extracting vessel, a central shaft mounted therein, propelling devices mounted upon said shaft, central bosses formed in said propelling devices, sleeves mounted upon said shaft between adjacent propeller bosses, an inlet for heating fluid at one end of said shaft, an outlet for said fluid at the opposite end of said shaft, means causing said heating fluid to traverse successively through the blades of each propelling device, ports in said sleeves for maintaining constant communication between said propelling devices, an inlet for said substance at one end of said vessel, an outlet for said substance at the opposite end of said vessel, and means whereby the reversal of propelling devices causes said substance to pass through the outlet therefor.

9. Apparatus for the extraction of oils, fats or greases from substances containing or yielding same, comprising an extracting vessel, a plurality of propelling devices disposed within said vessel, means whereby a heating fluid passes successively through all of said propelling devices, means for introducing solvent in a direction opposite to that in which said substances are moved by said propelling devices, an inlet for said substance at one end of said vessel, an outlet for said substance at the opposite end of said vessel, and means whereby the reversal of propelling devices causes said substance to pass through the outlet therefor.

10. Apparatus for the extraction of oils, fats or greases from substances containing or yielding the same, comprising an extracting vessel, a central shaft mounted therein, propeller bosses mounted upon said shaft, propeller blades mounted upon and integral with said propeller bosses, sleeves mounted upon said shaft between said propeller bosses, an inlet for heating fluid at one end of said shaft, outward and return passages in said propeller blades, ports in said bosses causing said fluid to traverse successively through the blades of each of said propelling devices, and ports in said sleeves for maintaining constant fluid communication between said propelling devices.

In testimony whereof I affix my signature.
HENRI ENGEL.